United States Patent Office 3,272,891
Patented Sept. 13, 1966

3,272,891
STABILIZING POLYMERS WITH ALKENOYL-
AMIDO- AND PHENYLBENZATRIAZOLES
Jerry Peter Milionis, Franklin Township, Somerset
County, William Baptist Hardy, Bound Brook, and
William Frederick Baitinger, Jr., Belle Mead, N.J.,
assignors to American Cyanamid Company, Stamford, Conn., a corporation of Maine
No Drawing. Filed Oct. 14, 1964, Ser. No. 403,928
6 Claims. (Cl. 260—895)

This application is a continuation-in-part of application Serial No. 2,129, filed January 13, 1960, now U.S. Patent 3,159,646.

This invention relates to the provision of polymeric materials which are resistant to degradation by ultraviolet light. More specifically, this invention relates to polymers having incorporated therein stabilizing amounts of compounds of the Formula I:

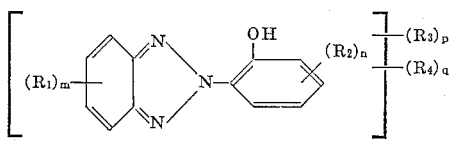

or the dimethylacetamide-soluble, low viscosity homopolymers of said compounds. In Formula I, $R_1$ and $R_2$ are lower alkyl, alkoxy, halogen, nitro, carboxy, sulfo, or sulfonamido, $R_3$ is alkenoylamino characterized by a polymerizable $CH_2=C<$ group, $R_4$ is alkenoyloxy characterized by a polymerizable $CH_2=C<$ group, $m$ and $n$ are each 0, 1 or 2 and $p$ and $q$ are 0, 1, 2 or 3, at least one of $p$ and $q$ being greater than zero, and $R_3$ and $R_4$ are substituents on the carbocyclic, phenyl or benz rings.

To be useful as a stabilizer for plastics, an ultraviolet absorber should absorb the ultraviolet in sunlight, should be sufficiently stable to undergo the processing conditions and should have sufficient solubility in various types of materials so that it may be incorporated into various plastic formulations.

Durability of protection depends in part on the ability of the stabilizer to remain in the plastic substrate. An unfortunately common deficiency of most stabilized plastics is the vulnerability of the U.V. absorber to solvent-leaching and evaporation off during heat treatments to which the plastics may be subjected.

The present invention concerns itself with the problem of preventing stabilizer losses because of either evaporation or solvent-leaching.

It is an object of this invention to provide a light-stabilized plastic composition, the light stabilizer of which is effective and remains so even under conditions which might cause other stabilizers to be leached out or evaporated off.

It has been found that 2-hydroxyphenylbenzotriazoles of Formula I or their homopolymers can provide protection from incident ultraviolet light to polymeric materials in which they are incorporated. Moreover, it has been found that the copolymers of polymerizable vinyl monomers with said benzotriazoles, are polymers of extraordinary stability to ultraviolet light. Furthermore, it has also been found that homopolymers of such benzotriazoles are also excellent stabilizers for such polyolefins.

The monomeric stabilizers of this invention are prepared by the reaction of either amino or hydroxy substituted 2-(hydroxyphenyl)benzotriazoles with an alkenoyl halide. A representative example of such a preparation is the reaction of 2-(4-amino-2-hydroxyphenyl)benzotriazole with an acrylyl chloride as shown by the following equation:

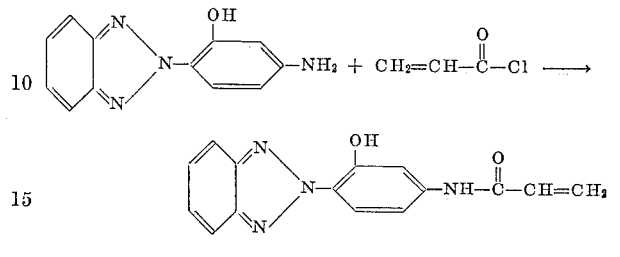

(1)

The alkenoyl halides which may be used in the preparation of the products of our invention include the acid chloride and the acid bromides of any alkenoic acid which has a polymerizable $CH_2=C<$ group. Among the alkenoic acids which may be used can be mentioned acrylic acid, methacrylic acid, and undecylenic acid. Of these compounds, of course, the simpler and more available examples such as acrylic acid and methacrylic acid, are to be preferred.

The aminobenzotriazoles which may be used to form the alkenylamido monomers within the scope of this invention have been described by Boyle and Milionis in U.S. Patent No. 3,055,896. These aminobenzotriazole intermediates are amino-2-hydroxyarylbenzotriazoles in which the amino group can be on the 2-aryl radical or on the benz ring. Either ring may be further substituted by chloro, bromo, sulfonamido, nitro, carboxy, alkoxy or alkyl. These compounds can be prepared by several methods, depending on where the amino group is to be. When the amino group is to be on the benzotriazole portion of the molecule, an o-aminophenol is diazotized and coupled into a meta-phenylenediamine. The coupling takes place para to one of the amino groups and the resulting o-aminoazo body is then triazolized by oxidation in the usual manner. This synthesis can be illustrated by the following preparation of the simplest member of the series:

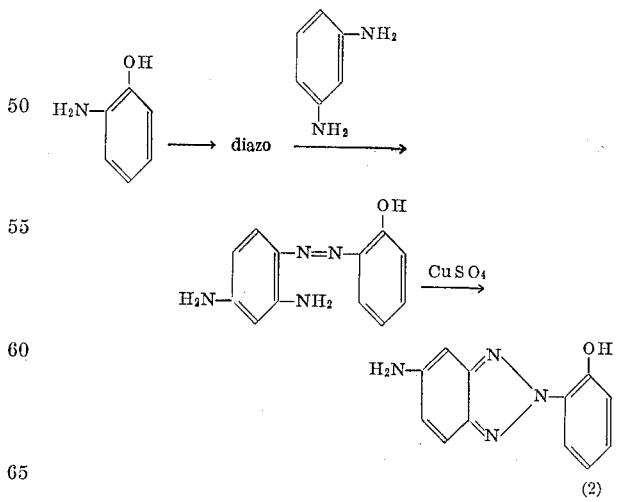

(2)

The o-aminophenols which can be used in this synthesis include o-aminophenol and any of its chloro, bromo, sulfonamide, sulfonic acid, carboxylic acid, alkoxy or alkyl derivatives such as 2-amino-4-chlorophenol, 2-amino-3,5-dibromophenol, 2-amino-4,6-dibromophenol, 2-amino-4-nitrophenol, 2-amino-6-chloro-4-nitrophenol, 2-amino-4,6-dinitrophenol, 2 - amino - 6 - methyl-4-bromophenol, 2-amino - 5 - ethoxyphenol, 2-amino-5-methylresorcinol, 3-amino-4-hydroxybenzoic acid, 3-amino-4-hydroxybenzene sulfonic acid, 4-amino-3-hydroxybenzene sulfonic acid, 3-amino-4-hydroxybenzene sulfonamide, 4-amino-resorcinol. The phenylene diamines usable in this synthesis include both m-phenylenediamine and its derivatives. A position ortho to one amino must be unsubstituted and must bear such relation to the other substituents that coupling will take place there. Phenylenediamines which are usable include meta-phenylenediamine, 1,3-diamino-2-chlorobenzene, 1,3-diamino-2,5-dichlorobenzene, 1,3-diamino-4-bromobenzene, 2,6-diaminotoluene and 3,5-diaminoanisole.

When the amino group is to be in the 2-aryl radical, a different method is used. An o-nitroaniline is diazotized and coupled with an aminophenol under conditions in which coupling takes place ortho to the phenol group. This ordinarily means, in the benzene series, an m- or p-amino phenol. In the naphthalene series, one must use an aminonaphthol in which the amino group is preferably in the other ring. The ortho nitro group is then reduced. Triazolization occurs by the reduction. An example of such a synthesis is the following:

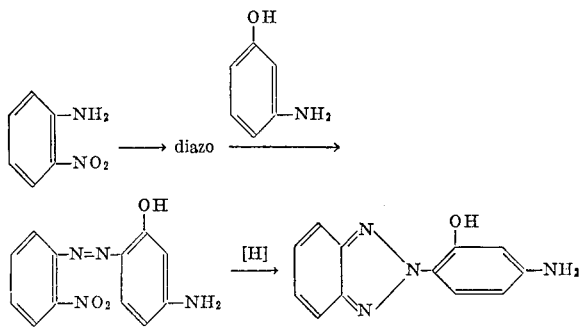

(3

The nitroanilines which may be used include ortho-nitroaniline, 6-methoxy-2-nitroaniline, 6-ethoxy-2-nitroaniline, 5-hydroxy-2-nitroaniline, 3-nitroanthranilic acid, 2-nitro-3-aminobenzoic acid, 3-nitrosulfanilic acid, 3-nitrosulfanilamide, 2-nitro-4-chloroaniline, 2-nitro-5,6-dichloroaniline, 2,4-dinitroaniline, 2-nitro-meta-toluidine and 3-nitro-para-toluidine. The aminophenols usable in this synthesis include 3-aminophenol, 2-methyl-3-aminophenol, 4-methyl-3-aminophenol, 2-chloro-3-aminophenol, 4-ethoxy-3-aminophenol and 2-bromo-4-aminophenol.

A third synthesis of such aminobenzotriazoles involves diazotizing 2,4-dinitroaniline and coupling the product to a para-substituted phenol having an ortho position open. The nitro groups are then reduced thus forming the triazole ring and the amino group on the benzo ring. This method is thus usable for this type of compound only. The phenols which can be used as coupling components include phenols and their alkyl, alkoxy, chloro, or bromo derivatives such as 4-chlorophenol, para-cresol, 4-tert-butyl-ortho-cresol, 2-tert-butyl-para-cresol, para-tert-butylphenol, 2-chloro-para-cresol, 5-chloro-2-hydroxybenzenesulfonic acid, 4-chlororesorcinol, 5-chlorosalicylaldehyde, para-methoxyphenol, para-ethoxyphenol, para-benzyloxyphenol and para-lauroxyphenol.

The hydroxy substituted triazoles used to prepare the alkenyloxybenzotriazole are prepared similarly, using the proper hydroxy substituted compounds. Thus, in order to introduce an additional hydroxyl into the 2-phenyl ring so that there will be a hydroxyl to esterify, the ortho nitroaniline is diazotized and coupled with the proper polyhydroxy substituted benzene such as resorcinol, hydroquinone, hydroxyhydroquinone, phloroglucinol, 1,2,3,5-tetrahydroxybenzene, and the like. The same type of compounds can be obtained by the diazotization of a 2,4-dihydroxyaniline and coupling into an aniline derivative as described in a manner similar to the first synthesis of amino derivatives described (Equation 2 above). Hydroxyl groups are introduced into the benz ring of the benzotriazole moiety by starting with the proper hydroxynitroaniline and coupling with a properly substituted phenol. If a polyhydric phenol such as resorcinol is used as the coupling component, the intermediate which is prepared will have a hydroxyl group on both the phenyl ring and the benz ring. Polyhydroxy compounds of this type may have two esterifiable hydroxyls on the phenyl ring as well as one on the benz ring, provided a trihydroxy benzene is used as the coupling component.

Mixed types having both an amide and an ester moiety are within the scope of this inventon. The intermediates for these are prepared by coupling a hydroxy-2-nitroaniline with a meta or para-aminophenol, or a polyhydroxy aniline such as 2-amino-5-methylresorcinol with a meta-phenylenediamine in a reaction similar to that illustrated by Equation 2 above.

The homopolymers of the compounds of Formula I are prepared by polymerizing monomeric 2-(o-hydroxy-4-alkenyloxyphenyl)benzotriazole or, less commonly, the corresponding 4-alkanamido derivative, under conditions such that the homopolymer is soluble in dimethylacetamide (DMAC) at least to the extent of five weight percent at 30° C. and, furthermore, has an intrinsic viscosity (measured by the procedure in ASTM D–1601–59T using DMAC as solvent) of 0.03 to 0.5 at 30° C. The polymerization procedure can take several forms and still yield the desired product. The connecting link in all the useful methods is the limitation on the degree of polymerization so that highly polymerized, and, consequently, polymer incompatible products are not obtained.

If a 2-(2-hydroxy-4-alkenoxyphenyl)benzotriazole is polymerized in non-polar solvent, such as benzene, without chainstopper under super-atmospheric pressure at reflux temperature, the product is a homopolymer which is insoluble in DMAC.

When, however, the polymerization is conducted in a non-polar solvent such as hexane, benzene, xylene, toluene, monochlorobenzene and a chainstopper (such as a phenolic compound, e.g., 2,4-dihydroxybenzophenone, phenol, resorcinol or p-cresol) is added, a homopolymer of the desired viscosity and solubility characteristics, is obtained. Surprisingly, by conducting the polymerization in DMAC (or the like, e.g., dimethylformamide), the desired homopolymer is obtained even if a chainstopper is not added to the polymerization mix. It is desirable to use a polymerization initiator such as azobisisobutyronitrile (ABIN) in each case.

Polymerization temperatures in all cases should be relatively low, e.g. 70°–110° C. Open vessels are used since the reaction proceeds at an atmospheric pressure. When inhibitors are used, they should be present in amounts of 5–10 parts by weight of the monomer. In general, all the monomers of Formula I which were previously described as copolymerizable to form light-stabilized copolymers, can alternatively be homopolymerized. The simple monomers are preferred in practice since they are more readily available and are less costly. Examples of these are 2-(o-hydroxy-4-acryloxyphenyl)benzotriazole and 2-(o-hydroxy-4-methacryloxyphenyl)benzotriazole.

The stabilizers of this invention can be incorporated in resins and plastics by conventional milling and blending techniques. Effective as additive light stabilizers are the homopolymers described above. For example, when the homopolymer of 2-(o-hydroxy-4-acryloxyphenyl)benzotriazole with an intrinsic viscosity of 0.03 to 0.5 (at 30° C.) and a DMAC solubility of at least 5% at 30° C., is added to a polymer such as polymethylmethacrylate, polystyrene, polyvinylfluoride or polycarbonate, the additive is found to be compatible with the polymer in concentrations which are capable of providing effective stability to the substrate. However, an important feature of this invention resides in the ability of the benzotriazole stabilizer to copolymerize with monomers used to prepare the various plastics, and thus become an integral part of the resin molecule. Such copolymerization can be carried out with any monomer containing ethylenic double bonds, such as ethylene, propylene, butylene, styrene, methyl styrene, ethyl styrene, propyl styrene, etc., acrylic acid and its amide, methacrylic acid, acrylonitrile, vinyl esters such as vinyl acetate and chloride and vinyl ethers such as vinyl butyral.

The usage of the unsaturated amides and esters of this invention in polymeric compositions of this invention is usually small. A minimum of 0.01% by weight should be in the composition. Amounts between 0.5 to 2.0% are preferred. For special uses much larger amounts, sometimes as much as 20% can be used.

It is an advantage of the new monomers of this invention that they are copolymerized much more effectively with other ethylenic monomers and polymers than polymerizable ultraviolet absorbers heretofore known. It is an advantage of the polymers of this invention that they show much greater stability to deterioration from ultraviolet light than do polymers heretofore known and that this stability can be retained through all kinds of treatment such as hot molding and even through contact with solvents which, in the past, extracted the conventional ultraviolet absorber from the polymeric composition.

This invention can be illustrated by the following examples in which parts are by weight unless otherwise specified.

*Example 1*

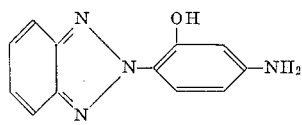

o-Nitroaniline (55.2 parts) is diazotized in the usual manner with concentrated hydrochloric acid (320 parts by volume) and sodium nitrite (27.6 parts). The excess nitrite is removed with sulfamic acid (6.0 parts). The clear diazonium chloride solution is added dropwise to a cooled solution (−5 to +5° C.) of m-aminophenol (65.6 parts) in 2000 parts by volume of water containing hydrochloric acid (120 parts by volume of 5 Normal). The crude product is collected as the hydrochloride salt of the amine.

The intermediate azo compound is slurried in water and treated with dilute sodium hydroxide to obtain the free amino azo compound. This is triazolized immediately by the addition of zinc dust (78.5 parts) and sodium hydroxide (480 parts by volume of 5 Normal). The crude product thus obtained is recrystallized three times from aqueous ethanol to yield orange-red needles of the amino phenylbenzotriazole.

*Example 2*

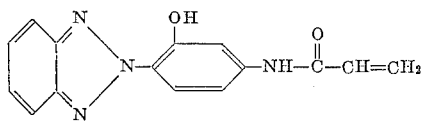

A slurry of 2.94 parts of the product of Example 1 in 75 parts by volume of monochlorobenzene is added in small portions to 1.18 parts of acrylyl chloride in 25 parts by volume of monochlorobenzene, to which 1.19 parts of pyridine and 0.1 part of hydroquinone have been added. The temperature of addition is −5 to 0° C. The mixture is stirred at this temperature for a short time and then at room temperature (25–30° C.) until the reaction is substantially complete. Recrystallization from alcohol and water and then from monochlorobenzene yields a yellow solid.

*Example 3*

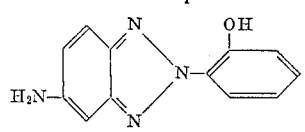

o-Aminophenol (27.3 parts) is diazotized with $NaNO_2$ (18 parts) and HCl (38 parts of real) in 250 parts by volume of water. The solution of diazonium salt is added to m-phenylenediamine (27 parts) and HCl (9.1 parts of real) in 500 parts by volume of water at 0–5° C. Concentrated sodium acetate solution then is added dropwise at 5° C. until the solution does not change Congo red paper. The mixture is stirred while warming to room temperature. The product is filtered off, washed with 10% sodium bicarbonate solution and water.

Oxidative triazolization of the resulting azo dye is carried out in a solution of $CuSO_4 \cdot 5H_2O$ (310 parts) in water (750 parts by volume), methanol (750 parts by volume) and ammonium hydroxide (1,250 parts by volume). The product isolated from this step is treated with boiling zinc and glacial acetic acid to destroy unreacted azo. The zinc is removed and the filtrate is drowned in water. The brown solid product is collected by filtration and recrystallized twice from alcohol.

*Example 4*

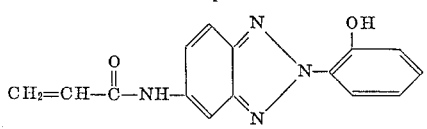

If the procedure of Example 2 is followed using the material of Example 3 in place of the compound of Example 1, the final product has the above structure.

*Example 5*

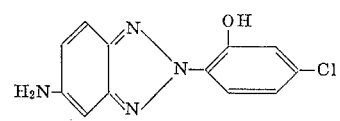

The procedure of Example 3 is followed using 4-chloro-2-aminophenol in place of the ortho-aminophenol to give a product of the formula above. Similarly, the correspondingly substituted aminohydroxyphenylbenzotriazole is obtained when any of 3,5-dibromo-2-aminophenol, 6-methyl - 2 - aminophenol, 6-methyl-4-bromo-2-aminophenol, 4,5-dimethyl-2-aminophenol, 5-methoxy-2-aminophenol, 5-ethoxy - 2 - aminophenol, 5-methyl-2-aminophenol or 2-amino-5-methylresorcinol is used in the procedure of Example 3.

*Example 6*

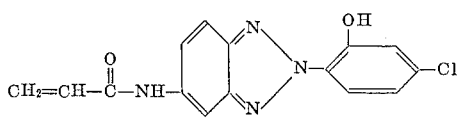

The procedure of Example 2 is followed using the product of Example 5 instead of the product of Example 1 in equivalent amounts. Similarly, when the other products described in Example 5 are used, the correspondingly substituted acrylamino 2-hydroxyphenylbenzotriazole is obtained.

*Example 7*

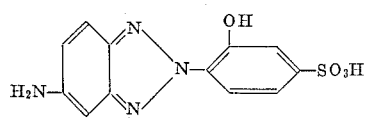

The procedure of Example 3 is followed using 3-amino-4-hydroxybenzene sulfonic acid in place of the orthoaminophenol except that the final product is salted out of the drowned filtrate. Similarly, the correspondingly substituted compounds are obtained when 3-amino-4-hydroxy-5-chlorobenzenesulfonic acid or 3-amino-4-hydroxy-5-methylbenzenesulfonic acid are used.

*Example 8*

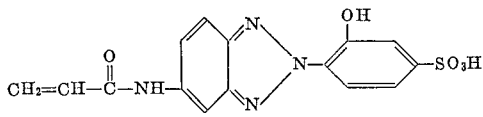

A mixture of 30.6 parts of the product of Example 7 with 20 parts of acrylyl chloride in 400 parts of water containing 25 parts of sodium hydroxide is stirred until no further test for free amino group is obtainable. If necessary, additional acrylyl chloride is added. The product is then isolated as the sodium salt by salting, filtering and drying.

*Example 9*

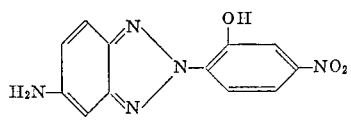

The procedure of Example 3 is followed using in place of the ortho-aminophenol an equivalent quantity of 4-nitro ortho-aminophenol. The treatment with zinc glacial acetic acid is omitted and purification is effected solely by recrystallization. When the treatment with zinc and glacial acetic acid is used instead, the corresponding nitro group is reduced and the corresponding diamine is obtained.

Similarly, other correspondingly substituted nitro-aminophenylbenzotriazoles and diaminophenylbenzotriazoles are obtained when 6-chloro-4-nitro-2-aminophenol, 4-chloro-5-nitro-2-aminophenol and 4-nitro-6-methyl-2-aminophenol are used.

*Example 10*

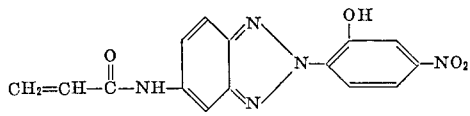

The procedure of Example 2 is carried out on the nitro compound formed in Example 9, using the said nitro compound in place of the product of Example 1 but in equivalent quantities. The product of the above structure is obtained.

*Example 11*

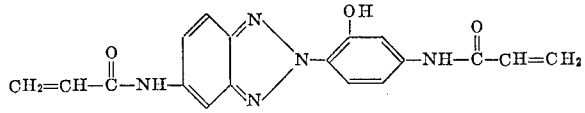

The procedure of Example 2 is followed using the diamino phenylbenzotriazole described in Example 9 in place of the product of Example 1 and in half the equivalent quantity.

*Example 12*

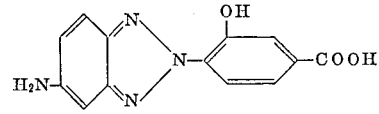

The procedure of Example 3 is followed using 4-amino-3-hydroxybenzoic acid in equivalent quantities in place of the ortho-aminophenol.

*Example 13*

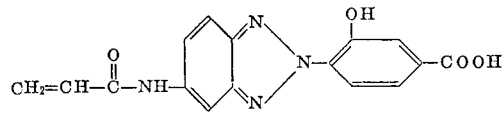

The procedure of Example 8 is followed using the product of Example 12 in equivalent quantities in place of the product of Example 7.

*Example 14*

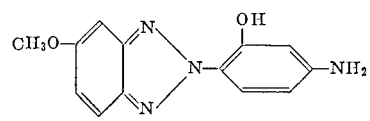

The procedure of Example 1 is followed using in place of ortho-nitroaniline an equivalent quantity of 5-methoxy-ortho-nitroaniline. Similarly, other correspondingly substituted amino benzotriazole derivatives are obtained when 6 - methoxy - ortho - nitroaniline - 4 - ethoxy-ortho-nitroaniline, 5-hydroxy-ortho-nitroaniline, 4-chloro-ortho-nitroaniline, 4-chloro-6-bromo-ortho-nitroaniline or 3,4,6-trichloro-ortho-nitroaniline are used.

*Example 15*

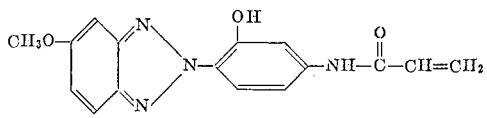

The procedure of Example 2 is followed using an equivalent quantity of the product of Example 14 in place of the product of Example 1. Similarly, when the other substituted phenyl benzotriazoles described in Example 14 are used in place of the product of Example 1, the correspondingly substituted acrylamido phenyl benzotriazole is obtained.

*Example 16*

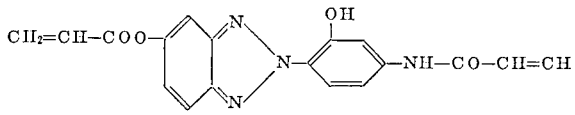

The procedure of Example 2 is followed using the product of Example 14 obtained when 5-hydroxy-o-nitroaniline is used as a starting material. This product of Example 14 is used in half the equivalent of the amount of the product of Example 1 used in Example 2.

*Example 17*

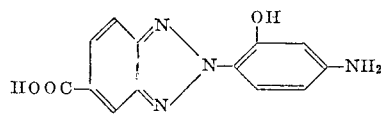

The procedure of Example 1 is followed using an equivalent quantity of 3-nitro-4-aminobenzoic acid in place of the ortho-nitroaniline. The product is isolated by acidification after the triazolization procedure.

Similarly, other correspondingly substituted amino-hydroxyphenylbenzotriazoles are obtained when 3-nitrosulfonic acid and 3-nitroanthranilic acid are used.

*Example 18*

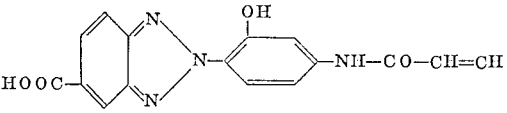

The procedure of Example 8 is used, using a quantity of the product of Example 17 equivalent to the quantity of the product of Example 7 used in Example 2. Similarly, when the other products disclosed in Example 17 are used in place of the product of Example 7, the correspondingly substituted acrylamido phenyl benzotriazole is obtained.

Example 19

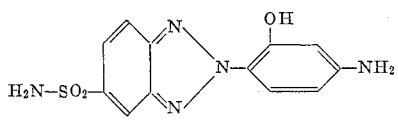

The procedure of Example 1 is followed using an equivalent quantity of 3-nitrosulfanilamide in place of ortho-nitroaniline. Similarly, other correspondingly substituted hydroxyaminophenylbenzotriazoles are obtained when 4-iodo-ortho-nitroaniline and 5-methyl-ortho-nitroaniline are used in place of ortho-nitroaniline.

Example 20

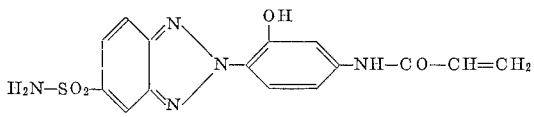

The procedure of Example 2 is followed using in place of the product of Example 1 an equivalent quantity of the product of Example 19.

Example 21

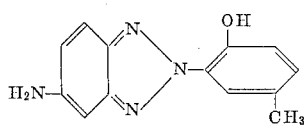

17.5 parts of sodium nitrite is added to 675 parts of concentrated sulfuric acid at room temperature. After the mixture is cooled to room temperature, 42 parts of 2,4-dinitroaniline is added slowly while the temperature of the mixture is maintained at 30 to 35° C. After diazotization is complete, this mixture is poured onto ice. The resulting solution is added to a cooled slurry of 27 parts of p-cresol, 563 parts of sodium hydroxide and 1000 parts of water while cooling in an ice bath. The mixture is allowed to stir while warming slowly to room temperature. The mixture is neutralized with HCl and the azo compound is filtered off. The compound is added to 1000 parts of 5 N NaOH. 100 parts of powdered zinc is added and this mixture is stirred and heated at 90° C. until the reaction is substantially complete. The mixture is filtered and the filtrate is neutralized with HCl. The tan solid is filtered and treated with hot glacial acetic acid and powdered zinc. The zinc is filtered off and the filtrate is flooded with water. The solid which forms is filtered off.

Example 22

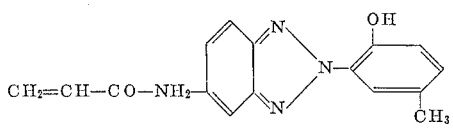

The procedure of Example 2 is followed using in place of the product of Example 1 an equivalent quantity of the product of Example 21.

Example 23

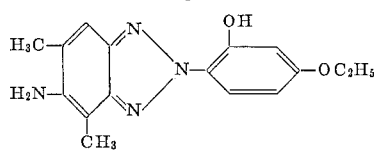

The procedure of Example 3 is followed using an equivalent quantity of 2,4-dimethylmetaphenylene diamine in place of the meta-phenylenediamine and an equivalent quantity of 5-ethoxy-ortho-aminophenol in place of ortho-aminophenol.

Example 24

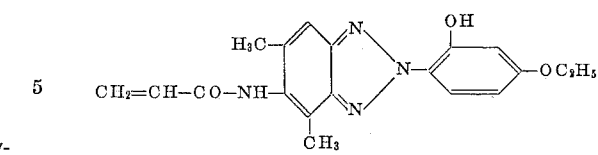

The procedure of Example 2 is followed using in place of the product of Example 1, an equivalent quantity of the product of Example 23.

Example 25

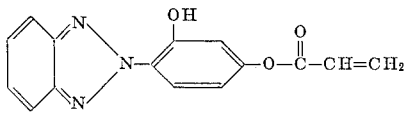

Acrylyl chloride (4.53 parts) is added dropwise to a solution of 2-(2,4-dihydroxyphenyl)benzotriazole (11.4 parts) in 100 parts by volume of water containing 2.0 parts of sodium hydroxide at 0–5° C. Stirring is continued until the reaction is substantially complete. The solid is collected by filtration and recrystallized from alcohol.

Example 26

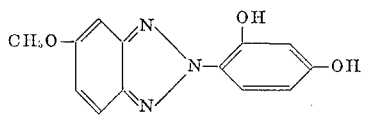

The procedure of Example 1 is followed using an equivalent quantity of resorcinol in place of the metaaminophenol and using an equivalent quantity of 5-methoxy-ortho-nitroaniline in place of the ortho-nitroaniline. Similarly, other correspondingly substituted benzotriazole derivatives are obtained when 6-methoxyorthonitroaniline, 4-ethoxyorthonitroaniline, 5-hydroxyorthonitroaniline, 4-chloroorthonitroaniline, 4-chloro-6-bromoorthonitroaniline, 3,4,6-trichloroorthonitroaniline, 3-nitrosulfonylic acid and 3-nitroanthranilic acid, 3-nitrosulfonanilimide, 4-iodo-nitroaniline, 5-methylorthonitroaniline are used in place of orthonitroaniline.

Example 27

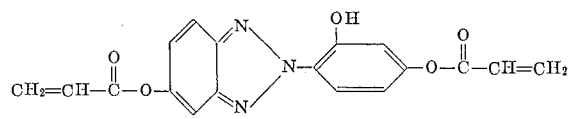

The procedure of Example 25 is followed using a half equivalent amount of the trihydroxyphenylbenzotriazole described in Example 26, being the product from 5-hydroxyorthonitroaniline and resorcinol, in place of the dihydroxy compound used in Example 25.

Example 28

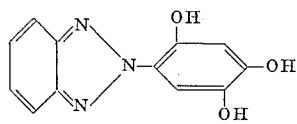

The procedure of Example 1 is followed using in place of meta-aminophenol an equivalent quantity of 2-hydroxyhydroquinone. When hydroquinone is used in place of the hydroxyhydroquinone, in equivalent quantity, the corresponding dihydroxy compound is obtained.

Example 29

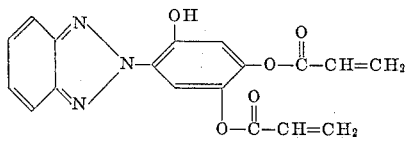

The procedure of Example 25 is followed using a half equivalent quantity of the product of Example 28, in place of the 2,4-dihydroxyphenylbenzotriazole. When the product of Example 28 using hydroquinone is used in place of the trihydroxy compound in full equivalent quantity to Example 25, the product isomeric to that of Example 25 is obtained.

*Example 30*

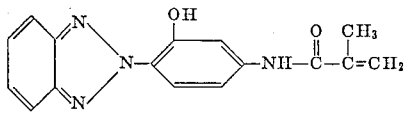

The procedure of Example 2 is followed using in place of acrylyl chloride an equivalent quantity of methacrylyl chloride. Similarly, the corresponding undecylenylaminophenylbenzotriazole is obtained when undecylenyl chloride is used in place of the acrylyl chloride. In the same way, when either of these acid chlorides are used in the procedures of Examples 4, 6, 8, 10, 11, 13, 15, 16, 18, 20, 22, and 24 in place of acrylyl chloride, the correspondingly substituted acylaminobenzotriazole results.

*Example 31*

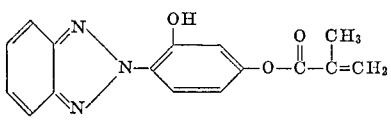

The procedure of Example 25 is followed using an equivalent quanity of methacrylyl chloride in place of the acrylyl chloride. Similarly, the corresponding ester is obtained when the acrylyl chloride is replaced with an equivalent quantity of undecylenyl chloride. In the same way, when either of these acid chlorides is substituted for acrylyl chloride in equivalent amounts in the procedures of Examples 25, 27 or 29, the corresponding acyloxybenzotriazole is formed.

*Example 32*

A mixture of 9 parts of styrene and about one part of the compound of Example 2 is heated in the presence of 0.1 part of benzoyl peroxide as a catalyst at 80° C. for about 8 hours and 100° C. for about 72 hours in a closed container.

The resulting copolymer is added to benzene and after complete solution, it is precipitated by the addition of an excess of ethanol. After removal, it is further extracted with ethanol to remove unreacted benzotriazole compound from the formed copolymer.

*Example 33*

0.5 gram of the product of Example 2 and 0.05 gram of benzoyl peroxide are placed in a Pyrex tube. 4.5 grams of styrene is added. The tube is flushed with nitrogen, then sealed. The mixture is heated at 120° C. for 100 hours. The copolymer is dissolved in toluene and precipitated in an excess of alcohol. It is then given several washings with hot alcohol. A spectrophotometric analysis shows 75 milligrams of the product of Example 2 per gram of copolymer. The efficiency of copolymerization is 75%.

A small amount of the copolymer is dissolved in hot toluene. This solution is brushed on a white pine panel. A very thin film is formed on the surface of the wood. A control sample is prepared by dissolving polystyrene in hot toluene and brushing this solution on a white pine panel. These two panels, along with a third panel which has no overcoating, are exposed in a Fade-Ometer for 14 hours. Both control samples become badly discolored, while the sample containing the U.V. absorbing copolymer shows only a slight discoloration.

When the products of Examples 4, 6, 8, 10, 13, 15, 20, 22, 24, 25, 30, or 31 are used in place of the product of Example 2, similar products are obtained.

*Example 34*

The copolymer of Example 33 is milled into polystyrene in the proportion of 5 parts to 95 parts of polystyrene, to give a blend containing almost 0.5% of the benzotriazole comonomer in the mixture. Molded pieces of the blend show improved resistance to exposure in the Fade-Ometer, compared to polystyrene.

*Example 35*

The procedure of Example 32 is followed using 9.95 parts of styrene and 0.5 part of the compound of Example 4. The resulting copolymer shows enhanced resistance of U.V. light, compared to pure polystyrene.

*Example 36*

A solution of 2.4 parts of dihexyl sodium sulfosuccinate and 0.13 part of sodium bicarbonate in 165 parts of deionized water is heated to 90° C. while maintaining a nitrogen atmosphere. There is then added gradually 36 parts of acrylonitrile, 74 parts of styrene, and 10 parts of the product of Example 25. At the same time there is added 2.4 parts of $(NH_4)_2S_2O_8$ in 15 parts of water in several portions. After the reaction is complete, excess acrylonitrile and styrene are removed by steam distillation. The polymer is coagulated, washed, and dried. This polymer is used in conjunction with alkyd resins to form surface coatings.

2.5 parts of the above tripolymer is milled into 97.5 parts of styrene-acrylonitrile (84:36) copolymer and molded into 50 mil chips. These, along with unmodified styrene acrylonitrile (84:36) chips are exposed in the weather-ometer. The control beecomes discolored while the material containing the U.V. absorbing comonomer shows little change.

When the compounds of Examples 2, 4, 6, 8, 10, 13, 15, 20, 22, 24, 30 or 31 are used in place of that of Example 25, similar results are obtained.

*Example 37*

A mixture of 95 parts of a resin mixture comprising a polyester of excess propylene glycol with equal mole quantities of phthalic and maleic anhydrides, blended with 50% of its weight of styrene, 4.75 parts of additional styrene, 0.25 part of the product of Example 31 and 0.50 part of benzoyl peroxide is poured into a mold made of glass plates and cured in an oven for 30 minutes at 80° C., 30 minutes at 105° C., and one hour at 120° C. The product is an ultraviolet light resistant resin composition.

When the products of Examples 2, 4, 6, 8, 10, 13, 15, 20, 22, 24, 25 or 30 are used in place of that of Example 31, similar products are obtained.

*Example 38*

A mixture of 4 parts of $(NH_4)_2S_2O_8$, 12 parts of sodium cetylsulfate and 800 parts of water is adjusted to pH of 8 with sodium hydroxide. Nitrogen is bubbled through the solution for a short time. Then, 320 parts of butylmethacrylate and 80 parts of the product of Example 25 are added and a slow stream of nitrogen is passed over the surface. The temperature is raised to 55° C. and held there until the reaction is substantially complete. The polymer is separated by freezing the latex and is washed with water and dried at 45° C. This copolymer, in combination with ethyl cellulose or nitrocellulose, can be used as a wood-finishing lacquer or as a coating for fabrics.

When the products of Examples 2, 4, 6, 8, 13, 15, 20, 22, 24, 30 or 31 are used in place of that of Example 25, similar products are obtained.

*Example 39*

A reaction mixture containing 7 parts of butyl methacrylate, 0.5 part of the product of Example 25, 0.075 part of stearic acid, 0.04 part of benzoyl peroxide, 0.06 part of the sodium salt of polyacrylic acid, 0.19 part of sodium sulfate in 24 parts of water is flushed with nitrogen and then maintained at 120° C. for several hours with stirring. The copolymer is collected and dried.

When the products of Examples 2, 4, 6, 8, 10, 13, 15, 20, 22, 24, 30 or 31 are used in place of that of Example 25, similar products are obtained.

*Example 40*

A mixture of 2 parts of the product of Example 11 and 98 parts of methylmethacrylate with a small amount of benzoyl peroxide as a catalyst is heated in Sheet-cells at 60° C. for 30 hours, followed by 10 hours at 125° C. The resulting polymer is resistant to discoloration by U.V. light.

When the products of Examples 16, 18, 27 or 29 are used in place of that of Example 11, similar products are obtained.

*Example 41*

The following emulsion is agitated at 40° C. for about 5 days:

|  | Parts |
|---|---|
| Acrylamide | 25 |
| 1,3-butadiene | 74.5 |
| Product of Example 11 | 0.5 |
| Sodium palmitate | 5 |
| Diazoaminobenzene | 0.75 |

The resulting latex-like dispersion is coagulated whereupon a soft elastic polymer is obtained.

*Example 42*

A mixture of 75 parts of butadiene, 24.5 parts of styrene, 0.5 part of the product of Example 4, 0.5 part of dodecylmercaptan, 180 parts of water, 0.3 part of potassium persulfate, and 5.0 parts of sodium stearate is stirred vigorously to form an emulsion. The emulsion is autoclaved and mained at 50° C. for 16 hours. The resulting latex is treated with sodium chloride solution, followed by addition to a dilute sulfuric acid bath. The crumbs that are formed are filtered, washed and dried at 60° C.

*Example 43*

When 2-(2-hydroxy-4-acryloxyphenyl)benzotriazole is polymerized at 70° C. in the presence of ABIN and 0.1 part of 2,4-dihydroxybenzophenone per part of the benzotriazole, a homopolymer which has over 5% solubility at 30° C. in DMAC is obtained.

*Example 44*

To a solution of 20 g. of 2-(2-hydroxy-4-acryloxyphenyl)benzotriazole in 125 cc. of DMAC, which had been purged with $N_2$ at 150° C., was added 0.4 g. of azobisisobutyronitrile and the solution heated at 70° C. for 2½ hours. The solution was then added to 600 cc. of methanol and the white solid which separated was filtered off, triturated with hot methanol and then dried. There was obtained 15.1 g. of product with an intrinsic viscosity of 0.072 in DMAC at 30° C.

*Example 45*

By blending 0.5 part of the homopolymer of Example 43 with 100 parts of polyvinylfluoride, a composition is obtained which is highly resistant to degradation by ultraviolet light.

The product of Example 44, likewise, imparts stability to polyvinylfluoride.

The homopolymers of Examples 44 and 45 are similarly incorporated in polycarbonates and polyvinylchloride and are found to impart light stability to the polymeric substrate.

We claim:

1. A composition comprising 0.01 to 2.0% of a member selected from the group consisting of (a) the compound of the formula:

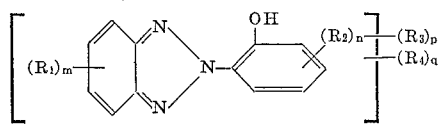

wherein $R_1$ and $R_2$ are selected from the group consisting of lower alkyl, lower alkoxy, halogen, nitro, carboxy, sulfonic acid and sulfonamido, $R_3$ is either acrylylamino or methacrylylamino, $R_4$ is either acrylyloxy or methacrylyloxy, $m$ and $n$ are integers less than three, and $p$ and $q$ are integers less than four, at least one of $p$ and $q$ being greater than zero, and $R_3$ and $R_4$ being bonded directly to carbocyclic aromatic rings in the phenyl benzotriazole nucleus; and (b) a homopolymer of the compound of (a) having an intrinsic viscosity at 30° C. of 0.03 to 0.50 and a DMAC solubility of at least 5%; and a polymer selected from the group consisting of polyesters, polystyrenes, polyolefins, polyacrylates, polycarbonates, polyvinylchlorides and polyvinylfluorides.

2. A composition comprising 0.01 to 2.0% of a homopolymer of 2-(2-hydroxy-4-acryloxyphenyl)benzotriazole and polyvinylfluoride resin, said homopolymer having an intrinsic viscosity at 30° C. between 0.03 and 0.50 and a solubility in DMAC of at least 5%.

3. A composition comprising 0.01 to 2.0% of a homopolymer of 2-(2-hydroxy-4-methacryloxyphenyl)benzotriazole and a polyvinylfluoride resin, said homopolymer having an intrinsic viscosity at 30° C. of 0.03 to 0.50 and a DMAC solubility of at least 5%.

4. Compositions comprising the copolymerization product of (1) monomers having a polymerizable reactive $CH_2\!=\!C\!<$ group and (2) at least 0.01% by weight of the compound of the formula:

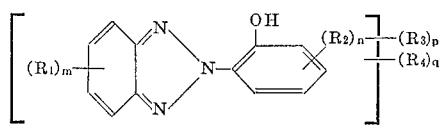

in which $R_1$ and $R_2$ are selected from the group consisting of lower alkyl, alkoxy, halogen, nitro, carboxy, sulfonic acid, and sulfonamido, $R_3$ is either acrylylamino or methacrylylamino, $R_4$ is either acrylyloxy or methacrylyloxy, $m$ and $n$ are integers less than three, $p$ and $q$ are integers less than four, at least one of $p$ and $q$ being greater than zero, and $R_3$ and $R_4$ being bonded directly to carbocyclic aromatic rings in the phenyl benzotriazole nucleus.

5. A polymerizable composition comprising polymerizable monomer containing a polymerizable reactive $CH_2\!=\!C\!<$ grouping and at least 0.01% by weight of a different polymerizable compound of the formula:

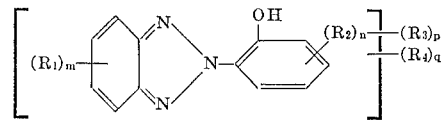

in which $R_1$ and $R_2$ are selected from the group consisting of lower alkyl, alkoxy, halogen, nitro, carboxy, sulfonic acid and sulfonamido, $R_3$ is either acrylylamino or methacrylylamino, $R_4$ is either acrylyloxy or methacrylyloxy, $m$ and $n$ are integers less than three, $p$ and $q$ are integers less than four, at least one of $p$ and $q$ being greater than zero, and $R_3$ and $R_4$ being bonded directly to carbocyclic aromatic rings in the phenyl benzotriazole nucleus.

6. A homopolymer of a compound of the formula:

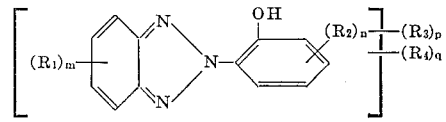

having an intrinsic viscosity at 30° C. of 0.03 to 0.50 and a DMAC solubility at 30° C. of at least 5%, wherein $R_1$ and $R_2$ are selected from the group consisting of lower alkyl, lower alkoxy, halogen, nitro, carboxy, sulfonic acid and sulfonamido, $R_3$ is either acrylylamino or methacrylylamino, $R_4$ is either acrylyloxy or methacrylyloxy, $m$ and $n$ are integers less than three, $p$ and $q$ are integers less than four, at least one of $p$ and $q$ being greater than zero, and $R_3$ and $R_4$ being bonded directly to carbocyclic aromatic rings in the phenyl benzotriazole nucleus.

References Cited by the Examiner

UNITED STATES PATENTS

| | | | |
|---|---|---|---|
| 3,074,910 | 11/1963 | Dickson | 260—45.8 |
| 3,213,058 | 10/1965 | Boyle et al. | 260—47 |
| 3,159,646 | 12/1965 | Milionis et al. | 260—868 |

MURRAY TILLMAN, *Primary Examiner.*

J. WHITE, *Assistant Examiner.*